Sept. 14, 1943.   E. W. AUSTIN   2,329,448
EXCAVATOR
Filed Oct. 13, 1939   6 Sheets-Sheet 1

FIG. 1.

INVENTOR
Ellsworth W. Austin
BY Marcus Lothrop
ATTORNEY

Sept. 14, 1943.  E. W. AUSTIN  2,329,448
EXCAVATOR
Filed Oct. 13, 1939   6 Sheets-Sheet 3

INVENTOR
Ellsworth W. Austin
BY
Marcus Lothrop
ATTORNEY

Sept. 14, 1943.  E. W. AUSTIN  2,329,448
EXCAVATOR
Filed Oct. 13, 1939   6 Sheets-Sheet 5

FIG_6_

FIG_7_   FIG_8_

FIG_9_

INVENTOR
*Ellsworth W. Austin*
BY
ATTORNEY

Sept. 14, 1943.  E. W. AUSTIN  2,329,448
EXCAVATOR
Filed Oct. 13, 1939  6 Sheets-Sheet 6

INVENTOR
Ellsworth W. Austin
BY
Marcus Lothrop
ATTORNEY

Patented Sept. 14, 1943

2,329,448

UNITED STATES PATENT OFFICE 2,329,448

EXCAVATOR

Ellsworth W. Austin, Cedar Rapids, Iowa, assignor to La Plant-Choate Manufacturing Company, Incorporated, Cedar Rapids, Iowa, a corporation of Delaware Application October 13, 1939, Serial No. 299,299

21 Claims. (Cl. 37—126)

My invention relates to excavating mechanisms and especially to earth-movers of a type designed not only to dislodge earthy material but also to pick up such material and transport it to a dumping location where the mechanism is effective to discharge its load.

Excavators of the type mentioned are usually utilized as vehicles drawn either singly or in multiple behind a draft implement such as a tractor. The tractor is usually supplied with a pair of winch drums which are power driven and controllable by the tractor operator and each of which is normally in braked or frictionally restrained position. By manipulation of either one of the two winch levers the tractor operator can first release the corresponding winch drum from its restraining brake and then connect it with a source of power so as to wind in an operating or propulsion cable. It has become standard practice to have two such normally braked, power-operated winches available at the rear of a tractor.

It is therefore an object of my invention to provide an excavator which is operable with a winch-equipped draft implement as described.

It is another object of my invention to provide an excavator in which the load is positively expelled.

Another object of my invention is to provide an excavator in which the expelling unit is positively propelled in both directions of operation.

Another object of my invention is to provide an excavator which is readily regulable by the tractor operator.

Another object of my invention is to provide an excavator which is cable-operated throughout.

Another object of my invention is to provide an excavator which is in general an improvement over excavators heretofore known.

A further object of my invention is to provide in an excavator details of construction which are conducive to better construction, easier fabrication and economical manufacture and maintenance.

The foregoing and other objects are attained in the embodiment of the invention illustrated in the drawings, in which—

In its preferred form, the excavator of my invention includes a main bowl which is movable with respect to a main frame and is provided with a front apron and a pusher connected by a mechanical linkage to the front apron, the pusher being propelled by two propulsion cables one of which is effective to move it positively in one direction and the other of which is effective to move it positively in the other direction.

In the exemplification of my invention disclosed in the drawings, there is provided a pair of front ground-engaging wheels 6 and 7 located at the extremities of a front axle 8 to which is connected a yoke 9, the interconnection being made by pivot pins 11. The yoke extends to a draft beam 12 forming a hitch to a tractor provided with a standard double-drum winch structure, not shown. The axle 8 is adjacent its center provided with a fore-and-aft pivot connection 13 to a swivel 14 the hub of which is journaled to turn about an inclined axis 16 in a mast 17 forming part of the main frame generally designated 18. The mast, as well as other portions of the main frame and other portions of the excavator generally, is fabricated of sheet metal shapes, such as plates, channels, angles and the like, placed in juxtaposition and fastened together by welding or other convenient fastening means. Adjacent the top of the mast 17 the main frame diverges to provide a generally horizontal, transversely extending platform 19 which at its ends merges with a pair of rearwardly extending frame side beams 21 and 22.

Each of the side beams 21 and 22 at its rearmost extremity serves as the mounting for a journal pin 23 forming an articulated connection with the adjacent side wall 24 or 26 of the main bowl, generally designated 27. The side walls 24 and 26 are generally comprised of vertically extending metal sheets provided with surface reinforcements in the shape of added members, such as 31, and the pins 23 are preferably stiffened in their connection with the side walls by reinforcing plates 32 and 33. The side walls 24 and 26 adjacent their rearward portions are connected to outriggers 36 and 37 extending to and connected with a rear axle 38 on which rear ground-engaging wheels 39 and 41 are journaled.

Figure 6:
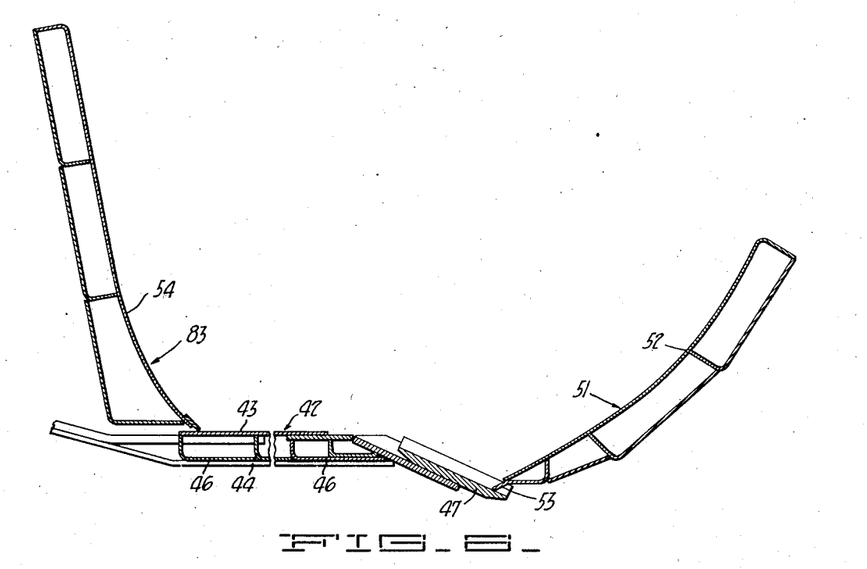
Fig. 6 is a cross-section showing in detail the construction of the main bowl bottom and of the apron wall.

In addition to the two sides 24 and 26, the main bowl includes a bowl bottom 42 which extends between the sides and not only acts as a brace member but likewise acts as a load support. Preferably (Fig. 6) the bottom is fabricated of an upper sheet 43 and a lower sheet 44 between which are situated special bent shapes 46. Each of these special shapes is preferably fabricated by taking a sheet or strip of the requisite width and then bending it lengthwise in a sheet metal break to provide a structure which in transverse cross-section is somewhat like a standard angle. There are differences in that the resulting special shape is absolutely uniform in metal gauge or thickness throughout, is not provided with the fillets of a standard angle, and has a different grain structure in that a standard angle is normally rolled whereas the mentioned bent shape is simply deformed from a previously planar sheet or strip. Each of the special shapes 46 is put into position and is held and firmly united to the sheets 43 and 44, as well as to its adjacent similar members, by any suitable fastening means, such as welding. The net result of this scheme of fabrication is to provide an exceedingly rigid and strong bottom membrane or wall for the main bowl yet one which is quite cheap to make and is somewhat lighter in weight than similar structures fabricated of standard shapes, such as angles or channels.

The forward part of the bottom 42 terminates in a cutting edge 47 which preferably is a separate or detachable strip of special material which will take and hold a sharp cutting edge. I have found by an extensive experience that it is preferable to arch or bow the cutting edge 47 somewhat so that the center portion thereof is lower or behind the side portions thereof.

In accordance with my invention, and to increase the carrying capacity of the main bowl, as well as to facilitate the reception and discharge of material, I preferably provide, to cooperate with the bottom 42 and the cutting edge 47, and to operate well between the side walls 24 and 26, a front apron generally designated 51. The front apron preferably includes a forward wall 52 which is a duplex member fabricated very much as is the bottom 42 and has its rear termination in a relatively sharp edge 53. The forward wall 52 is bounded by side plates 54 and 56 which act as reinforcements in connecting the forward wall to side arms 57 and 58, respectively.

Each of the arms 57 and 58 is preferably a three-sided hollow box and can, if desired, be fabricated by folding a planar sheet in such a way that the folded portions are spaced from each other a predetermined amount and have substantially the finished contour shown in the drawings. The front apron 51 is related to the remaining part of the structure by offset pivot connections 59 and 61 at the ends of the arms 57 and 58, the pivot pins being mounted in the reinforcing side plates 32 and 33, respectively. The location of the axis of the pivots 59 and 61 is preferably such as to be substantially at the center of the arc established by the inner wall of the front apron 54, so that earth pressure upon such front apron tends neither to lift it nor to close it. Hence, operation of the front apron, whether laden or unladen, is accomplished with substantially the same force, being the force necessary to overcome the weight of the part.

As an instrumentality for operating the front apron 51, I provide a carriage, generally designated 71, operable along the upper edges of the main bowl side walls 24 and 26. The carriage 71 includes a pair of side beams 72 and 73 which adjacent their rearmost portions are connected by a cross-beam 74. Each side beam 72 or 73 is supported on rollers 76 and 77 journaled therein and engaging the upper edge of the associated side wall. Furthermore, to serve as lateral guides to the carriage and to insure that the carriage always runs in alignment with the side walls of the main bowl, each of the side beams 72 or 73 is provided with rollers 78 and 79 mounted far apart in a skirt 81 depending from the beam and engaging the respective one of the side walls 24 and 26.

Mounted on and forming part of the carriage 71 is a pusher 83. The pusher is inclusive of a transversely extending, approximately vertical, somewhat curved wall 84 fabricated very much as are the main bowl bottom 42 and the forward wall of the front apron 52, and extends between the side walls 24 and 26 with slight clearance so that the pusher 83 acts in effect as a plunger or expeller for loads contained within the main bowl. The pusher 83 is related to the carriage 71 by welded connections, including a reinforcing truss 86 joined to the cross-bar 74, so that the carriage 71 and the pusher 83 always move in unison and so that each imparts rigidity and stiffness to the other. Furthermore, side gusset plates 87 and 88 are secured to the pusher wall 84 and extend to the carriage 71 to which they are joined by reinforcing channels 89 and 91.

Figure 1:
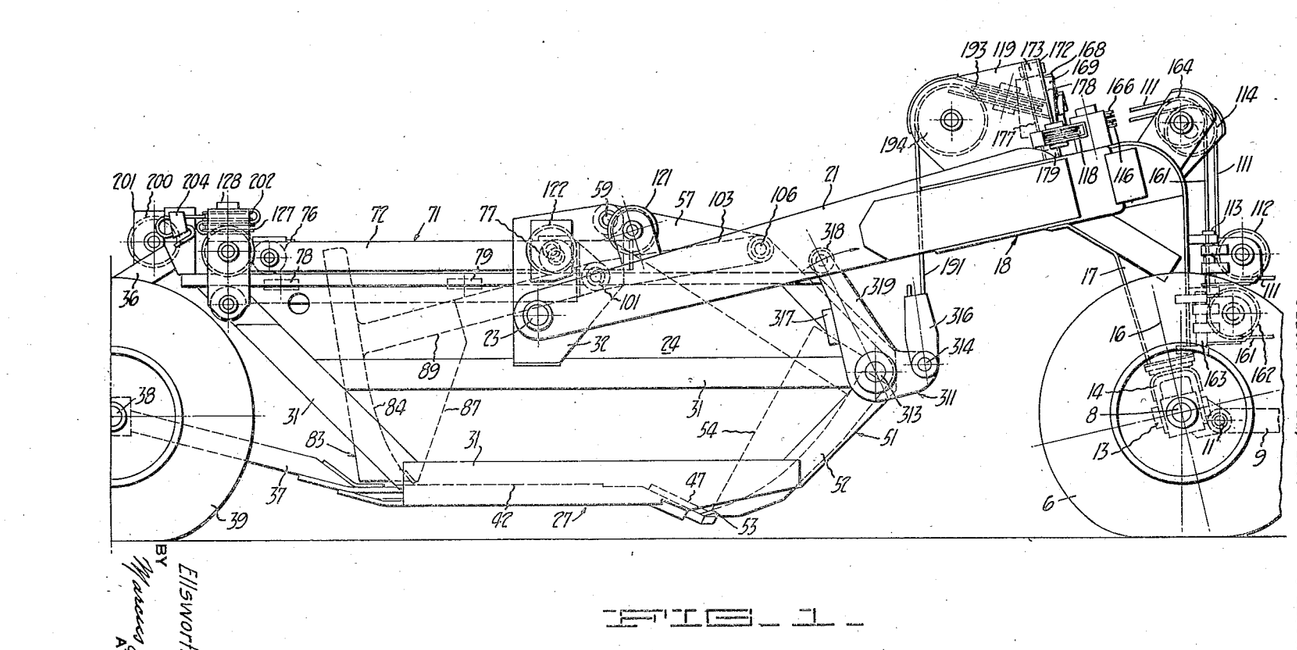
Fig. 1 is a side elevation of an excavator constructed in accordance with my invention.
Figure 7:
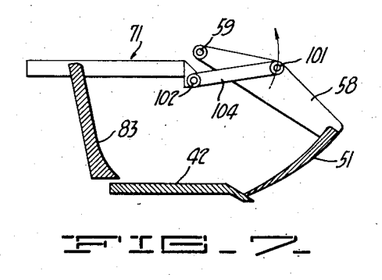
Figs. 7, 8 and 9 are diagrammatic cross-sections showing the pusher and front apron in successive positions.

The relationship of the carriage and the pusher with respect to the front apron is such that the pusher 83 and the front apron 51 always move in unison. On the beams 72 and 73 adjacent the forward end thereof are journals 101 and 102 for the rearmost end of the adjacent one of a pair of operating struts or links 103 and 104 extending forwardly and connected at their forward end to journal pins 106 and 107 situated in the arms 57 and 58 of the front apron. The pivotal axes of the journals 101 and 102, as well as of the journals 106 and 107, are such, with respect to the positions of the pusher 83 and the front apron 52, and with respect to the location of the pivotal axis of the journals 59, that when the pusher is in its rearmost position, as shown in Figs. 1 and 7, the front apron is closed or is in its lowermost position resting against the cutting edge 47. But as the carriage 71 is advanced, there is a simultaneous advancing movement of the pusher 83 and of the links 103 and 104 which press upon the arms of the front apron 51 which then begins to open.

Figure 8:
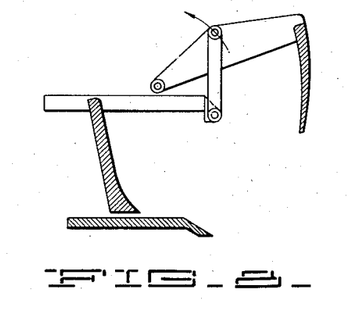
Figure 9:
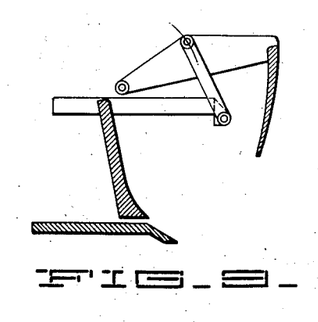

Although this rising movement of the apron is simultaneous with that of the pusher, it is not at exactly the same rate, since, as shown diagrammatically in Figs. 7, 8 and 9, the links 103 and 104 pass through a position in which they are at right angles to the general plane of the carriage 71 and then incline themselves in an opposite direction, so that as the pusher 83 comes forwardly the apron 51 opens very rapidly at first, then slows considerably in its opening movement until finally it is stationary instantaneously as the pusher continues to advance, and then moves downwardly slightly toward closed position as the pusher achieves its foremost location. Then, when the pusher is retracted, the links 103 and 104 first slowly lift the front apron from a slightly closed position to maximum open position, and then more and more rapidly close the front apron as the pusher more slowly approaches its rearmost position. Throughout the entire range of movement of the pusher and of the front apron, therefore, there is a simultaneous movement of the two without any lost motion, yet the rate of movement varies because of the relationship of the link connection between the two. There is always, therefore, a relatively rapid apron opening for the initial movement of the pusher and a subsequent very slow movement of the apron for the latter portion of the pusher movement toward open position. Yet on return movement, as the pusher begins to return, the front apron has a relatively slow movement and then, as the pusher is substantially in its retracted position, it very quickly moves into its own closed position.

To impel the pusher forwardly and simultaneously operate the front apron by means of the link connection, and to maintain the carriage 71 free from twisting strains about a vertical axis which would tend to cock it or to cause it to bind as it travels on the upper edges of the main bowl, I provide a propulsion cable 111 (Fig. 5) which is under the control of the tractor operator and which extends rearwardly from one of the power-operated, normally braked winches on the tractor. The cable 111 is first trained around a leading sheave 112 mounted on a pivot connection 113 on the mast 17. The cable 111 then passes around a guide sheave 114 at the upper portion of the mast and engages a lower guide pulley 116 located adjacent the center of the platform 19. The cable 111 then extends around a corner sheave 118 journaled in an upright guard plate 119 upstanding from the platform 19 and the side beam 21, and extends thence rearwardly along the side beam 21 to engage a guide pulley 121 mounted thereupon.

Figure 5:
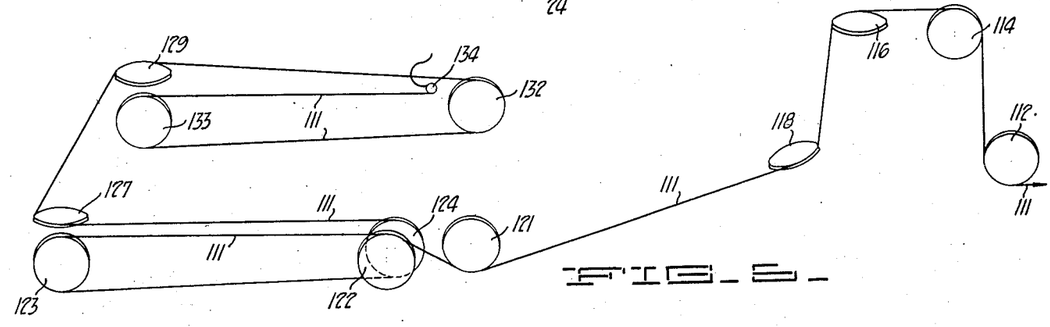
Fig. 5 is a diagram showing in isometric perspective the arrangement of the other propulsion cable.

From the guide sheave 121 the cable 111 passes around a primary sheave 122 journaled on the side plate 32 and then partially encompasses a sheave 123 which is journaled upon the side beam 72 of the carriage 71. This reverses the direction of the cable 111 which thence extends forwardly to pass around a secondary sheave 124 journaled on the side plate 32 coaxially with the sheave 122. From the stationary secondary sheave 124 the cable 111 thence extends rearwardly to a generally horizontal sheave 127 mounted to turn on a vertical journal 128 at one side of the cross-beam 74.

The cable 111 then extends across the pusher or carriage member to a similar sheave 129 mounted on a journal 131 extending vertically from the other side of the cross-beam 74, and passes forwardly to extend around a primary sheave 132 secured to the side plate 33 and in alignment with the primary sheave 122. From the sheave 132 the cable 111 extends thence rearwardly to pass partially around a sheave 133 in alignment with the sheave 123 and secured to the carriage beam 74. From this point the cable 111 extends forwardly to an anchorage 134 on the side plate 33 and either can terminate at this point or can extend to any convenient position for a reel of additional cable which can be threaded through the various sheaves in the event the cable 111 should break.

With the arrangement of the cable 111 described, even though the cable is away from the center of the structure out of the dirt, traction upon the propulsion cable 111 causes a force to be exerted equally at opposite sides of the carriage 71 so that a uniform effort is exerted upon the carriage to move it forwardly within the main bowl. Since the traction or propulsion cable extends across the carriage there is an equalization of force applied to the two sides thereof, and hence there is no imposition of a twisting or cocking force upon the pusher, and the pusher is thereby propelled forwardly with equal pressure at opposite sides thereof despite any inequality of resistance of the load or in its distribution.

The force exerted through the propulsion cable 111 not only is transmitted to the carriage so that the pusher 83 is moved forwardly, but likewise some of the force is transmitted through the links 103 and 104 to lift the front apron. Since the links 103 and 104 pass center as the pusher comes forwardly, the force causing the first portion of the movement of the pusher is opposed by the weight of the front apron, but after the links are past center the weight of the front apron is effective to assist in the final ejecting movement or terminal forward travel of the pusher so that the latter portion of the work of the cable 111 is considerably lessened. In some other structures, the forward movement of the pusher is opposed by springs, and the force required to compress the spring becomes greater and greater as the travel of the pusher approaches its greatest extent. But in the present instance the load upon the cable 111, although originally a maximum, is a minimum when the load is discharged.

Figure 4:
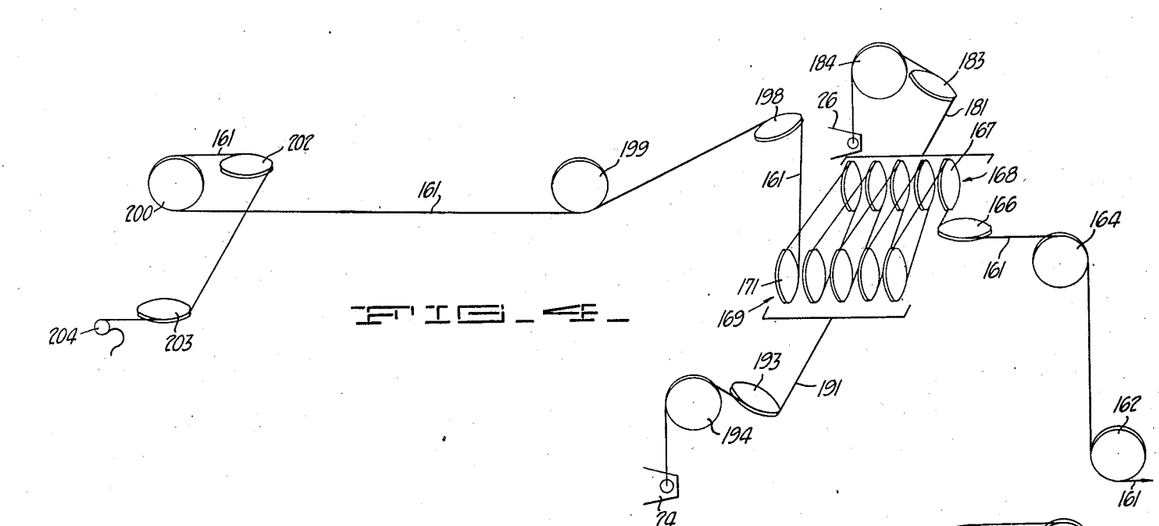
Fig. 4 is a diagram showing in isometric perspective the arrangement of one propulsion cable.

To return the pusher and front apron and also to lift and lower the main bowl with respect to the main frame, I provide a second propulsion cable 161 (Fig. 4). This cable extends from the second winch drum, which is normally braked but is under the control of the tractor operator for connection to its source of power, and engages with a sheave 162 journaled on an axis 163 on the mast 17. From the sheave 162 the cable 161 extends around a guide sheave 164 on the mast 17 and then extends around a generally horizontal sheave 166 above and coaxial with the sheave 116 on the platform 19. From the sheave 166 the cable 161 extends into one of a family of sheaves 167 included in a block 168 which is one of a pair of blocks the other one 169 of which contains a similar family 171 of sheaves. The cable 161 is trained around all of the sheaves in the blocks 168 and 169 in proper sequence, so that if the end of the cable is held when the cable 161 is tensioned, the blocks 168 and 169 are urged toward each other.

To serve as suitable supports and guides for the blocks 168 and 169, each of them is provided with a bearing box 172 encompassing a square guide bar 173 extending transversely above the platform 19 and appropriately spaced therefrom not only by the guard 119 but by a companion guard 174 which also extends upwardly from the platform 19. In addition, the blocks 168 and 169 have side plates 177 and 178 resting on opposite sides of a rail 179 upstanding from the platform 19. A heavy cable 181 at one end has an anchorage 182 in the block and extends around an approximately horizontal sheave 183 journaled in a corner of the guard 174 and thence extends over an approximately vertical sheave 184 journaled in a projection of the guard 174 and finally passes downwardly to a connection with the side wall of the main bowl.

In a generally comparable fashion, to the block 169 is connected a heavy cable 191 secured thereto by an anchorage 192 and thence extending around a substantially horizontal sheave 193 journaled in the guard 119 and then passing around an approximately vertical sheave 194 journaled in a projection of the guard 119. Finally, the cable 191 drops downwardly to a connection with the side wall 24 of the main bowl.

Now, while the cables 181 and 191 can be directly connected to the main bowl and directly bear its weight, as shown in Fig. 4, I prefer to utilize an indirect connection which also affords a buffer or cushion for the carriage 71 and pusher. To jar loose material adhering to the pusher and to the front apron, it is expedient to force the pusher several times sharply against a stop at the end of its travel. This is effective but is a severe strain upon the mechanism, so I gain the benefits but avoid the excessive shock, by providing, as shown in Fig. 1, bell cranks 311 and 312 mounted on pivot pins 313 in the side walls 24 and 26, respectively.

Each bell crank has a pivot connection 314 to an anchor 316 at the terminus of the respective one of the heavy cables 181 and 191, so that the weight of the main bowl urges the bell cranks to rock into abutment with stops 317 secured upon the respective side walls 24 and 26. Rollers 318 on the long arms 319 of the bell cranks are disposed in the path of movement of the two carriage side beams 72 and 73 to be abutted thereby during the final expelling movement of the pusher. This movement is therefore abruptly resisted by the weight of the main bowl, which affords a yielding but effective buffer for jarring the pusher and front apron.

If the propulsion cable 161 were anchored after passing about the sheaves in the blocks 168 and 169, tension upon the cable 161 would cause the blocks to approach each other and to tension the heavy cables 181 and 191 so that the main bowl would be lifted with respect to the main frame and with respect to the ground. Also, if the cable 161, being so anchored, were then slackened, the weight of the main bowl would still exert tension upon the heavy cables 181 and 191 and would draw the blocks 168 and 169 apart so that the main bowl would lower not only with respect to the main frame but likewise with respect to the ground. Thus, if the cable 161 were so anchored, an operator, properly taking in and paying out the cable 161, would be enabled at will to lift and lower the main bowl with respect to the ground.

But, in accordance with my invention, I preferably do not anchor the cable 161 adjacent either of the blocks 168 or 169, but prefer to continue the cable and utilize it as a means for positively returning the pusher from its advanced position to its retracted position. For that reason, from the last sheave of the family 171 I extend the propulsion cable 161 around an approximately horizontal sheave 198 journaled in the guard 176. The cable then extends along the side beam 22 to underlie a sheave 199 which is on the same journal as the sheave 132, and continues rearwardly to pass around a sheave 200 mounted upon a stationary support 201 which is a projection from the side wall 26. From the sheave 200 the cable 161 passes around a sheave 202 journaled at one end of the beam 74 on the same axis as the sheave 129, and extends thence across the carriage 71 to pass around a sheave 203 mounted to turn on the same journal as the sheave 127. This sheave is thus symmetrically disposed at the other end of the carriage beam 74. The cable 161 then terminates in a stationary anchorage 204 on the side wall 24 or, being anchored, can extend to a suitable location for a reel of additional cable, so that in the event any portion of the cable 161 breaks, the path can be retraced and the cable rethreaded.

With the arrangement of the cable 161 described, tension upon it is exerted not only upon the blocks 168 and 169 but also upon the carriage 71, tending to retract such carriage and also to lower the front apron. Thus, when the cable 111 is slackened and the cable 161 is tensioned, the pusher 57 is retracted if its resistance to movement is less than the resistance to movement of the blocks 168 and 169. On the other hand, if the blocks present less resistance, then they are first pulled into their most closely approached position and, after they abut and can no longer approach, the tension on the cable 161 is then effective to retract positively the rear end gate into its rearmost position. Correspondingly, when the cable 161 is slackened and the cable 111 is tightened, the gate and the front apron are moved forwardly or into discharging position, but since the blocks 168 and 169 are affected by stress in the cable 161, it is possible to vary the height of the main bowl while operating the pusher. If, for example, the cable 111 is taken in at the same rate as the cable 161 is paid out, then no change in position of the blocks 168 and 169 occurs, and the height of the main bowl is unchanged. On the other hand, if the rate of taking in the cable 161 is less than or greater than the rate of paying out the cable 111, a resulting movement of the blocks 168 and 169 and of the main bowl occurs, this movement then being in response to the difference in rate of movement of the cables 161 and 111.

Figure 2:
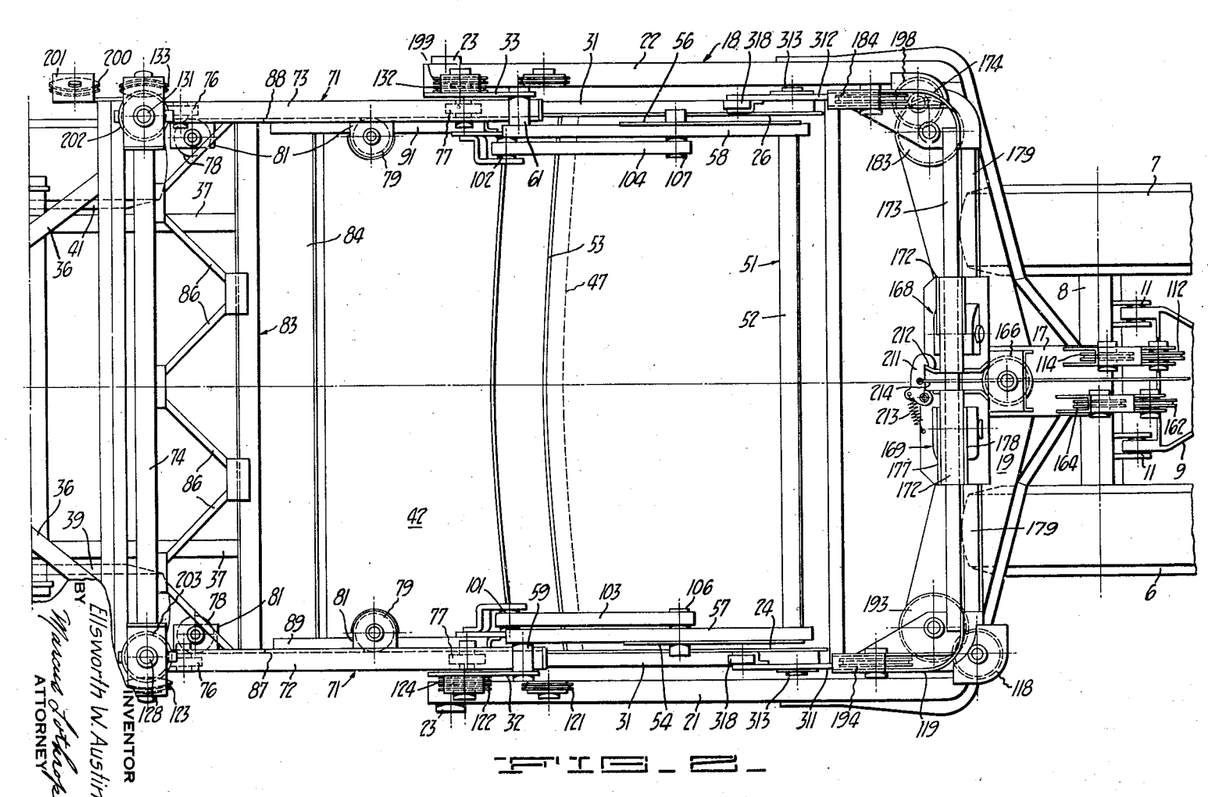
Fig. 2 is a plan of the excavator shown in Fig. 1.
Figure 3:
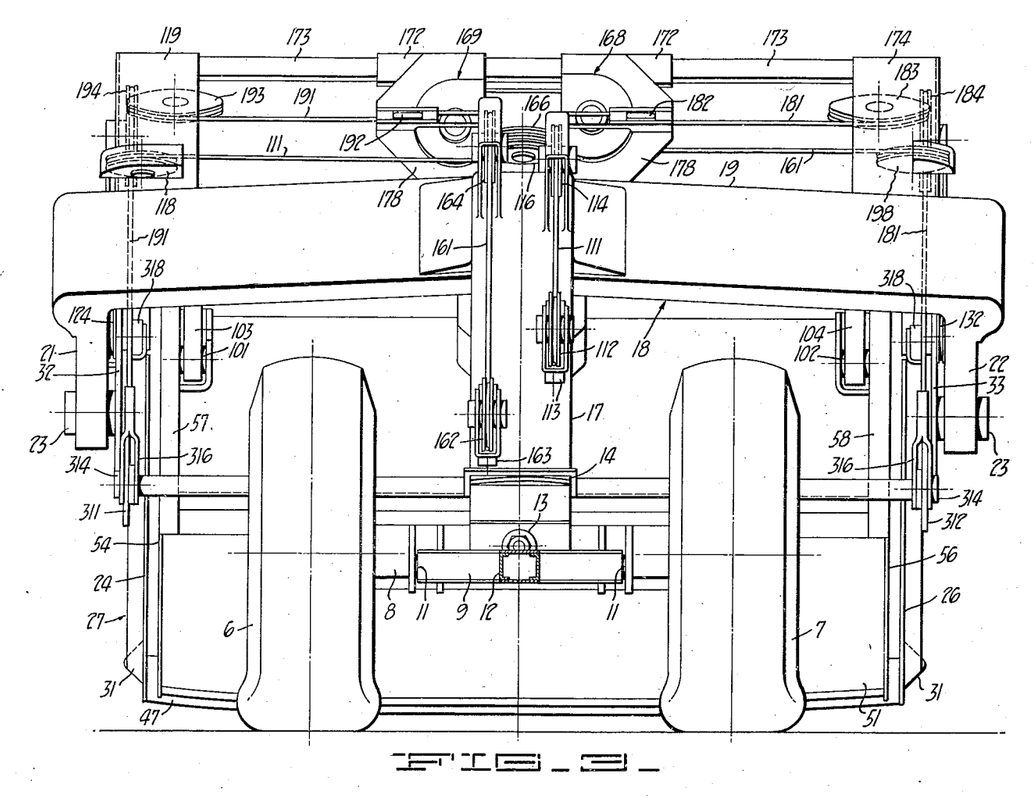
Fig. 3 is a front elevation, to an enlarged scale, of my excavator.

In accordance with my invention, however, I provide means for making operation of the cables 161 and 111 somewhat independent of the operation of the blocks, or make the block operations automatically responsive to certain operations of the cables. As especially disclosed in Fig. 2, the block 169 can be provided with a latch 211 which is pivotally mounted thereon and is adapted, when the blocks are closely approached, to engage a flange 212 extending from the block 168. A spring 213 normally keeps the latch 211 out of engagement with the flange 212, but when the blocks are closely approached the operator can pull upon an actuating cable 214 attached to the latch 211 and overcome the urgency of the spring 213 to bring the latch 211 into engagement with the flange, so that the weight of the main bowl and the load therein is borne not by the cable 161 but rather directly upon the latch 211. This is especially useful during long transport since the strain upon the cable 161 is entirely relieved. When this engagement is to be discontinued, slacking of the cable 214 permits the spring 213 to remove the latch 211 from the flange 212, and the blocks 168 and 169 are then again free to move.

I also provide optionally means for holding the blocks 168 and 169 in any one of a plurality of positions so that, after the height of the main bowl with respect to the ground has once been established by operation of the cable 161, such position of the main bowl can be fixed and no load will be borne by the cable 161 except as it is tensioned to return the pusher from ejecting position to retracted position. This arrangement is especially useful in spreading earth. Furthermore, such mechanism is preferably made automatically responsive to operation of the cable 111 so that no further operator controls are necessary. In this arrangement, as illustrated particularly in Figs. 10 and 11, a block 268 is provided with a latch bar 271 which is adapted to engage a bar 272 on a co-operating block 269. This engagement can take place in any one of several positions, since the latch bar 271 is provided with a plurality of notches 273. While three such notches 273 are shown, it is obvious that only one such notch can be utilized or that ten or fifteen notches can be provided to afford any desired number of adjustments in height of the main bowl.

For engaging the latch bar 271 with the bar 272, since the weight of the bar and a spring 274 normally keeps it out of such engagement, I provide a bell crank 281 which is mounted on a pivot pin 282 projecting from ears 283 upstanding from the platform 19. One arm 284 of the bell crank underlies the central portion of the latch bar 271 and is effective to cam against it, while the other arm 286 of the bell crank is pierced to receive an operating rod 287 which is effective upon the arm 286 through the intermediary of a surrounding coil spring 288 provided with an adjusting nut 289 to regulate the tension thereof. The operating rod 287 is connected by a universal connection 291 to an upstanding lever 292 joined to the housing 293 of the sheave 114. The housing 293, instead of being rigidly attached to the mast 17 as in the modification shown in Fig. 1, for example, is rather pivotally mounted by a pin 294 journaled in ears 296 upstanding from the mast 17.

In the operation of this structure, when the cable 161 has been tensioned to locate the main bowl at the desired height above the ground, a subsequent pull or tensioning of the propulsion cable 111 urges the housing 293 to rotate around the axis of the journal 294 and against the urgency of a return spring 297 one end of which engages an eye 298 on the housing 293 and the other end of which is connected to a bracket 299 upstanding from the platform 19; so that not only is the urgency of the spring 297 overcome but also the lever 292 is rotated. This actuates the operating rod 287 through the medium of the spring 288, and the bell crank 281 is likewise rotated to lift the latch bar 271.

Figure 10:
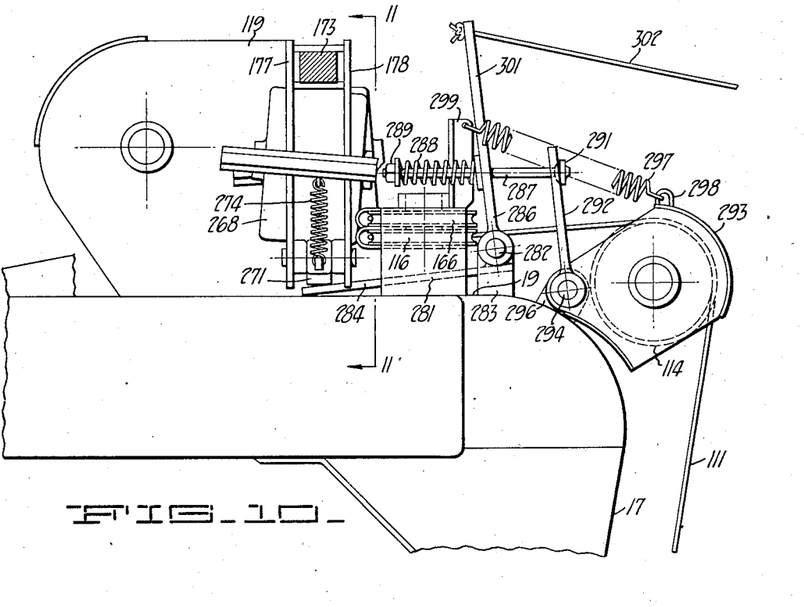
Fig. 10 is a side elevation of an automatic cable-controlling structure.
Figure 11:
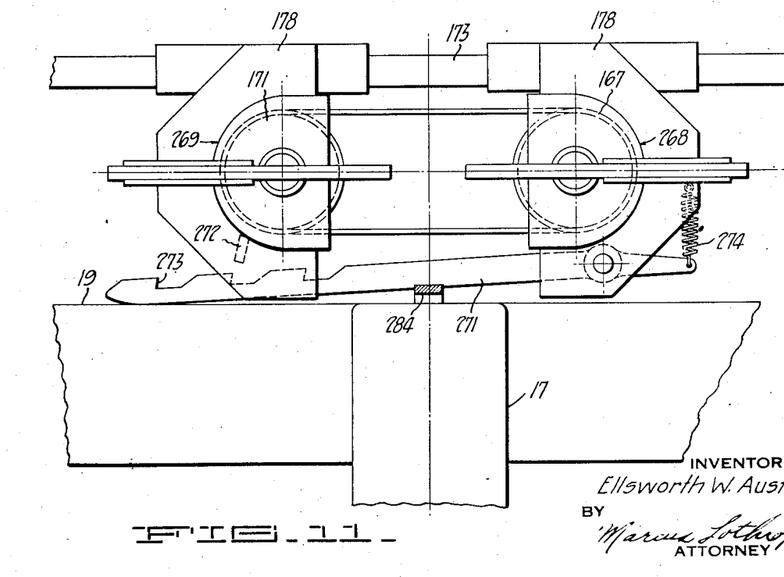
Fig. 11 is a cross-section of the automatic cable-controlling structure shown in Fig. 10, the plane of section being indicated by the line 11—11 of Fig. 10.

As soon as the latch bar is lifted with one of the adjacent notches 273 in contact with the bar 272, the parts interlock as the load on the sheave blocks 268 and 269 is relieved. Thus the entire load of the main bowl is held by the latching arrangement as long as tension exists in the cable 111. As soon as such tension is released, however, the spring 297 is effective again to rotate the sheave housing 293 so that the bell crank 281 rotates in a counter-clockwise direction, as seen in Fig. 10, permitting the latch bar 271 to drop out of engagement with the bar 272, and releasing the parts for control by the cable 161.

Furthermore, in this installation, in the event it is not desired to depend entirely upon the tensioning of the cable 111 to effectuate the latching operation, the lever arm 286 can be provided with an extension 301 to which a cable 302 is fastened and which extends forwardly to the operator's station on the tractor, so that by manually tensioning the cable 302 the latching arrangement can be actuated.

I claim:

1. An excavator comprising a main bowl open at one end, a front apron, a pivot for constraining said front apron to swing between a first position occupying said end and a second position swung away from said end, a pusher, means for constraining said pusher to move in a rectilinear path through said main bowl between a first position remote from said open end and a second position adjacent said open end, a link, a pivot connecting said link to said pusher, and a second pivot connecting said link to said front apron.

2. An excavator comprising a main bowl having an open end, a front apron, a pivot mounting said front apron on said main bowl to swing toward and away from said end, a pusher, means for constraining said pusher to move in a path through said main bowl between a first position remote from said end and a second position adjacent said end, a link, a pivot connecting said link to said front apron at a predetermined point, a second pivot connecting said link to said pusher at a point which approaches and passes said predetermined point during the movement of said pusher through said main bowl to produce movement of said front apron in two directions for a single direction of movement of said pusher.

3. An excavator comprising ground engaging supports, a main bowl, means mounting said main bowl upon said supports for lifting and lowering movement with respect to the ground, a pusher disposed within said main bowl, means constraining said pusher to advancing and retracting movement with respect to said main bowl, a cable, means for connecting said cable to said main bowl to exert a lifting force thereupon, and means for connecting said cable to said pusher to exert a retracting force thereupon.

4. An excavator comprising ground engaging supports, a main bowl, means mounting said main bowl upon said supports for lifting and lowering movement with respect to the ground, a pusher disposed within said main bowl, means constraining said pusher to advancing and retracting movement with respect to said main bowl, a single propulsion cable, and means operatively relating said propulsion cable to said main bowl and to said pusher effective to overcome the resistance of said main bowl to lifting and to overcome the resistance of the pusher to retracting.

5. An excavator comprising ground engaging supports, a main bowl, means mounting said main bowl upon said supports for lifting and lowering movement with respect to the ground, a pusher disposed within said main bowl, means constraining said pusher to advancing and retracting movement with respect to said main bowl, a front apron disposed at one end of said main bowl, means constraining said front apron to move toward and away from said end, a link, means connecting said link to said pusher and to said front apron, a first propulsion cable, means for connecting said first cable to advance said pusher, a second propulsion cable, and means for connecting said second cable to lift said main bowl and retract said pusher.

6. An excavator comprising ground engaging supports, a main bowl, means mounting said main bowl upon said supports for lifting and lowering movement with respect to the ground, a pusher disposed within said main bowl, means constraining said pusher to advancing and retracting movement with respect to said main bowl, a first propulsion cable, means for connecting said first propulsion cable to advance said pusher, a second propulsion cable, and means for connecting said second cable to lift said main bowl, and to retract said pusher.

7. An excavator comprising ground engaging supports, a main bowl, means mounting said main bowl upon said supports for lifting and lowering movement with respect to the ground, a pusher disposed within said main bowl, means constraining said pusher to advancing and retracting movement with respect to said main bowl, means for advancing said pusher, means for lifting said main bowl and retracting said pusher, means for restraining said movement of said main bowl, and means responsive to the operation of said advancing means for operating said restraining means.

8. An excavator comprising ground engaging supports, a main bowl, means mounting said main bowl upon said supports for lifting and lowering movement with respect to the ground including a frame member pivotally connected to said main bowl, a pair of sheaves, means constraining said pair of sheaves to translation on said frame member, connections between said pair of sheaves and said main bowl, a pusher, means mounting said pusher for movement within said main bowl, and a cable engaging said pair of sheaves and connected to said pusher.

9. An excavator comprising ground engaging supports, a main bowl, means mounting said main bowl upon said supports for lifting and lowering movement with respect to the ground including a frame member, means for moving said main bowl considered as one part with respect to said frame member considered as another part including a pair of sheaves, means for mounting said sheaves upon one of said parts for movement in a fixed path, means for connecting said sheaves to the other of said parts, a pusher, means mounting said pusher for movement within said main bowl, means for limiting the range of said pusher movement, and a propulsion cable engaging said sheaves to draw them together and engaging said pusher to draw said pusher toward said limiting means.

10. An excavator comprising ground engaging supports, a main bowl, means mounting said main bowl upon said supports for lifting and lowering movement with respect to the ground, a load mover, means mounting said load mover for movement within said main bowl, a single propulsion cable, and means for operatively relating said cable to said main bowl mounting means and to said load mover mounting means to move said main bowl and said load mover.

11. An excavator comprising ground engaging supports, a frame member, means mounting said frame member upon said supports, an earth-sustaining member, means mounting said earth-sustaining member to move relative to said frame member, a common guide bar, means mounting said guide bar on said frame, a pair of bearing boxes, means mounting both of said bearing boxes to slide on said guide bar, cables connecting said bearing boxes and said earth-sustaining member, sheaves mounted in each of said bearing boxes, a propulsion cable reeved around said sheaves, and means for guiding said propulsion cable onto one of said sheaves with said cable parallel to said guide bar.

12. An excavator comprising ground engaging supports, a main bowl, means for mounting said main bowl upon said supports for lifting and lowering movement with respect to the ground including a frame member, a pusher, means for mounting said pusher for movement through said main bowl in a predetermined path, a bell crank having one arm extending into said path, means pivoting said bell crank on said main bowl, a sheave, means mounting said sheave on said main frame, and a cable reeved on said sheave and connected to the other arm of said bell crank.

13. In a scraper, having: ground support; a digging blade, capable of being raised and lowered with respect to the ground; a dirt-extruding element capable of being shifted to extrude dirt; and a main body capable, in conjunction with the dirt-extruding element, of serving as a dirt-holding container; the combination therewith of: a rope to shift the dirt-extruding element to extrude dirt; and a rope to raise and lower the digging blade; said last named rope being operatively attached to the dirt-extruding element, whereby tension in said last named rope tends to return the dirt-extruding element.

14. An excavator comprising a main bowl having an open end, a front apron, means for constraining said front apron to move in a path between a closed position occupying said open end and an open position spaced away from said open end, a pusher, means for constraining said pusher to move in a path extending through said bowl between a first position remote from said open end and a second position adjacent said open end, and a strut pivoted to said pusher and to said front apron for moving said front apron from said open position into said closed position during the same time and whenever said pusher moves from said second position into said first position.

15. An excavator comprising a main bowl having an open end, a front apron, means for constraining said front apron to move in a path between a closed position occupying said open end and an open position spaced away from said open end, a pusher, means for constraining said pusher to move in a rectilinear path through said bowl between a first position remote from said open end and a second position adjacent said open end, and a strut movably fastened directly on said pusher and directly on said front apron for constraining said front apron and said pusher to move simultaneously.

16. An excavator comprising ground engaging supports, a main bowl, means mounting said main bowl upon said supports for lifting and lowering movement with respect to the ground, a pusher disposed within said main bowl, means constraining said pusher to advancing and retracting movement with respect to said main bowl, and a single force-transmitting means common to said pusher and to said main bowl for tending when energized simultaneously to lift said main bowl and to retract said pusher.

17. An excavator comprising ground engaging supports, a main bowl, means mounting said main bowl upon said supports for lifting and lowering movement with respect to the ground, a member movably related to said main bowl to cooperate therewith in handling earth contained thereby, a cable connected to exert force on said main bowl and on said member for lifting and for controlling the lowering of said main bowl and for moving said member, means for restraining lowering of said main bowl, and means for operating said restraining means.

18. An excavator comprising ground engaging supports, a main bowl, means mounting said main bowl upon said supports for lifting and lowering movement with respect to the ground including a frame member, means for moving said main bowl considered as one part with respect to said frame member considered as another part including a pair of sheaves, means for mounting said sheaves upon one of said parts for movement in a common rectilinear path, a propulsion cable, and means for guiding said propulsion cable onto one of said sheaves with said cable parallel to said path.

19. An excavator comprising ground engaging supports, a main bowl, means mounting said main bowl upon said supports for lifting and lowering movement with respect to the ground including a frame member, a pair of bearing boxes, means for mounting said bearing boxes to slide upon said frame in a common rectilinear path, means connecting each of said bearing boxes to said main bowl, sheaves mounted in said bearing boxes, a propulsion cable reeved around said sheaves, and means for guiding said propulsion cable onto one of said sheaves with said cable parallel to said path.

20. An excavator comprising ground engaging supports, a main bowl, means including a frame member for mounting said main bowl upon said supports for lifting and lowering movement with respect to the ground, a pusher, means for mounting said pusher for movement through said main bowl, an abutment member having a portion projecting into the path of said pusher, and means for movably connecting said abutment member to said frame and to said main bowl.

21. An excavator comprising ground-engaging supports, a frame member, means mounting said frame member upon said supports, an earth-sustaining member, means mounting said earth-sustaining member to move relative to said frame member, a pair of coplanar guide sheaves mounted upon said frame member, a pair of bearing boxes, a cable connected to said earth-sustaining member extending around one of said guide sheaves and fastened to one of said bearing boxes, a second cable connected to said earth-sustaining member extending around the other of said guide sheaves and fastened to the other of said bearing boxes, planar sheaves journalled in said bearing boxes with the planes of said sheaves out of the plane of said guide sheaves, means on said frame member and engaged by said bearing boxes for guiding said bearing boxes in a common path to hold said first and second cables coplanar with both of said guide sheaves, a propulsion cable reeved around and coplanar with one of said planar sheaves, and a lead sheave on said frame member engaged by and tangent to said propulsion cable.

ELLSWORTH W. AUSTIN.